United States Patent
Hiroki et al.

[19]

[11] Patent Number: 6,097,465
[45] Date of Patent: *Aug. 1, 2000

[54] IN PLANE SWITCHING LCD WITH 3 ELECTRODE ON BOTTOM SUBSTRATE AND 1 ON TOP SUBSTRATE

[75] Inventors: Masaaki Hiroki; Satoshi Teramoto; Takeshi Nishi, all of Kanagawa; Shunpei Yamazaki, Tokyo, all of Japan

[73] Assignee: Semiconductor Energy Laboratory Co., Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/805,891

[22] Filed: Mar. 3, 1997

[30] Foreign Application Priority Data

Mar. 1, 1996 [JP] Japan .................................. 8-071029

[51] Int. Cl.[7] .................................................. G02F 1/1343

[52] U.S. Cl. .......................... 349/141; 349/139; 349/143

[58] Field of Search .................................. 349/139, 143, 349/33, 141; 345/93, 96, 67

[56] References Cited

U.S. PATENT DOCUMENTS

| | | | |
|---|---|---|---|
| 3,774,989 | 11/1973 | Takahashi | 349/141 |
| 3,814,501 | 6/1974 | Schindler | 349/113 |
| 3,833,287 | 9/1974 | Taylor et al. | 349/165 |
| 3,838,909 | 10/1974 | Fitzgibbons | 349/62 |
| 3,843,231 | 10/1974 | Borel et al. | 350/160 |
| 3,864,905 | 2/1975 | Richardson | 349/65 |
| 3,876,287 | 4/1975 | Sprokel | 349/117 |
| 3,975,085 | 8/1976 | Yamada et al. | 349/141 |
| 4,097,128 | 6/1978 | Matsumoto et al. | 349/128 |
| 4,181,563 | 1/1980 | Miyaka et al. | 349/141 |
| 4,272,162 | 6/1981 | Togashi et al. | 349/179 |
| 4,345,249 | 8/1982 | Togashi | 349/141 |
| 4,385,805 | 5/1983 | Channin | 349/141 |
| 4,493,531 | 1/1985 | Bohmer et al. | 349/143 |
| 4,601,547 | 7/1986 | Shingu | 349/179 |
| 4,856,875 | 8/1989 | Kozaki et al. | 349/179 |
| 4,878,742 | 11/1989 | Ohkubo et al. | 350/347 |
| 4,923,286 | 5/1990 | Grupp | 349/128 |
| 5,035,490 | 7/1991 | Hubby, Jr. | 349/63 |
| 5,128,782 | 7/1992 | Wood | 349/61 |
| 5,293,261 | 3/1994 | Shashidhar et al. | 349/143 |
| 5,448,385 | 9/1995 | Deffontaines et al. | 349/141 |
| 5,583,678 | 12/1996 | Nishino et al. | 349/118 |
| 5,608,232 | 3/1997 | Yamazaki et al. | 257/66 |
| 5,639,698 | 6/1997 | Yamazaki et al. | 437/228 |
| 5,745,203 | 4/1998 | Valliath et al. | 349/113 |
| 5,831,707 | 11/1998 | Ota et al. | 349/141 |
| 5,870,160 | 11/1998 | Yanagawa et al. | 349/141 |
| 5,914,761 | 6/1999 | Ohe et al. | 349/132 |
| 5,914,762 | 6/1999 | Lee et al. | 349/141 |
| 6,011,606 | 11/1998 | Ohe et al. | 349/141 |

FOREIGN PATENT DOCUMENTS

| | | |
|---|---|---|
| 63-21907 | 12/1979 | Japan . |
| 56-128988 | 10/1981 | Japan . |
| 57-104113 | 6/1982 | Japan ..................................... 349/139 |
| 63-21907 | 5/1988 | Japan . |
| 6-202073 | 12/1992 | Japan . |

(List continued on next page.)

*Primary Examiner*—William L. Sikes
*Assistant Examiner*—Heidi L. Eisenhut
*Attorney, Agent, or Firm*—Fish & Richardson P.C.

[57] ABSTRACT

A liquid crystal panel which can operate at high speed is provided. The liquid crystal panel is constructed such that an electric field having a direction parallel to substrates is formed between pairs of electrodes with respect to a liquid crystal layer in which TN type liquid crystal is disposed. This electric field boosts a change from a state in which major axes of liquid crystal molecules orient in a direction vertical to the substrates to a state in which the major axes orient in the direction parallel to the substrates. Thereby, the change of the states of the liquid crystal molecules which has relied only on orientation restricting force in the past may be accelerated. Then, it allows the liquid crystal panel to respond quickly.

20 Claims, 9 Drawing Sheets

FOREIGN PATENT DOCUMENTS

| | | |
|---|---|---|
| 6-214244 | 1/1993 | Japan . |
| 7-36058 | 7/1993 | Japan . |
| 7-43716 | 7/1993 | Japan . |
| 7-43744 | 7/1993 | Japan . |
| 6-160878 | 9/1993 | Japan . |
| 7-120791 | 10/1993 | Japan . |
| 7-134301 | 11/1993 | Japan . |
| 7-72491 | 2/1994 | Japan . |
| 6-244103 | 9/1994 | Japan . |

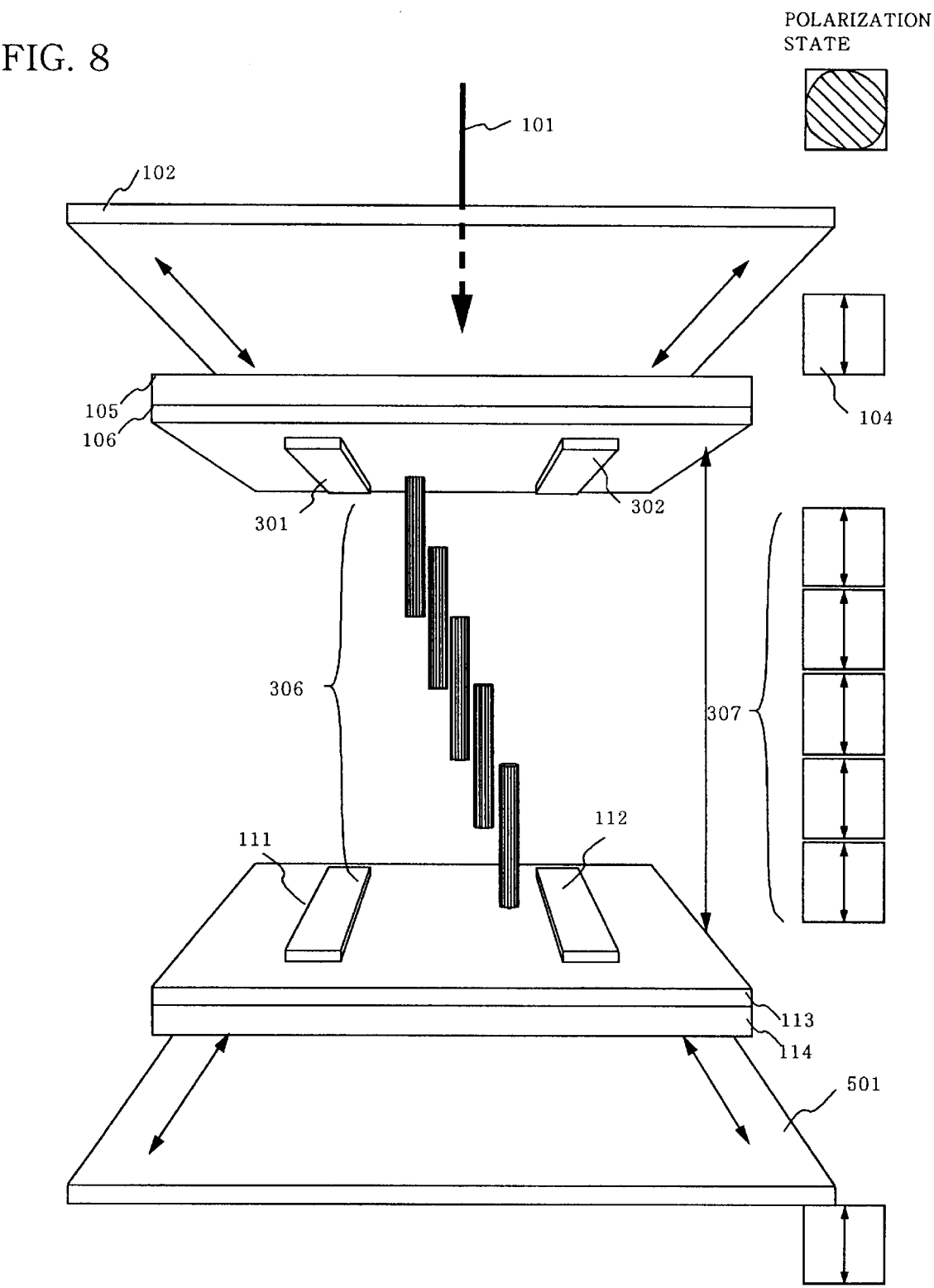

IN PLANE SWITCHING LCD WITH 3 ELECTRODE ON BOTTOM SUBSTRATE AND 1 ON TOP SUBSTRATE

BACKGROUND OF THE INVENTION

1. Field of Invention

The present invention relates to an arrangement of a liquid crystal electrooptical device and more particularly to an arrangement of a liquid crystal electro optical device which is capable of quick response.

2. Description of Related Art

There has been conventionally known display devices utilizing liquid crystal typified by the TN type liquid crystal. The TN type liquid crystal electro-optical device operates as follows by adequately selecting the following two states.

There is one state in which liquid crystal material interposed and held between a pair of substrates is spiraled such that the direction of major thereof is turned by 90° from one substrate to the other substrate. There is also another state in which the major axes orient in the direction of the pair of substrates (in the direction vertical to the substrates).

An optical state of light transmitting through the liquid crystal layer is changed by selecting either of the above-mentioned two states to select whether to transmit or not to transmit the light which enters the liquid crystal panel.

In this operation, the liquid crystal molecules are caused to orient in the direction between the substrates (hereinafter this is defined as the first state) by applying electrical potential between a pair of electrodes disposed on the pair of substrates.

When no electrical potential is applied to the pair of electrodes, the liquid crystal molecules are tuned and spiraled by 90° from one substrate to the other substrate (this is defined as the second state) due to the orientation processing means provided on the substrates in advance.

In the operation described above, the change from the second state to the first state is caused by applying electric field from the electrodes disposed on the pair of substrates. That is, it is caused by forcibly orienting the major axes of the liquid crystal molecules by the electric field by counteracting orientation restricting force.

Meanwhile, the change from the first state to the second state is caused by the orientation restricting force generated from the orientation processing means provided on the substrates. That is, the liquid crystal molecules which have been put into the predetermined state by the electric field forcibly by counteracting the orientation restricting force are put into the state in which the direction of the major axes is turned by 90° between the substrates by the orientation restricting force when no electric field is applied. It is noted that the orientation restricting force is caused mainly by inter-molecular force.

There has been also known an arrangement in which active elements typified by a TFT (thin film transistor) are disposed in each pixel in order to carry out the above-mentioned operation more quickly. This arrangement is made such that electric charge applied to the pixel electrode is controlled by the active elements per each pixel. A liquid crystal display having this arrangement is called as an active matrix type liquid crystal display.

When this active matrix type arrangement is adopted, the change from the second state to the first state is caused by the electric field under control of the active elements. However, the change from the first state to the second state is caused still by the orientation restricting force.

In the active matrix type liquid crystal display, although the speed of the change from the second state to the first state may be increased by utilizing the thin film transistor which responds quickly as the active element the speed of the change from the first state to the second state caused by utilizing the orientation restricting force cannot be increased even if the active element is improved.

In the arrangement in which the display is made by switching the two states which the liquid crystal can take, the change from the second state to the first state and that from the first state to the second state are caused in different ways as described above. That is, the electric field is utilized to obtain the first state from the second state and the orientation restricting force is utilized to obtain the second state from the first state.

However, the response speed thereof cannot be increased even if the active elements are improved in the method utilizing the orientation restricting force. It means that there is a certain limit in the response speed in switching the two states. It then becomes a factor for defining an upper limit of characteristics of a liquid crystal shutter which is required to operate at high speed or of a display which is required to display in high definition or at high speed.

Further, unclear or unnatural display is caused by the difference of operating modes (asymmetrical operation) in taking the above-mentioned two states as the display is operated at high speed.

Accordingly, it is an object of the invention disclosed in the presents specification to solve the above-mentioned problem of the method of changing from one state to the other state by applying the electric field and from the other state to one state by the orientation restricting force as the method for realizing the two states, of liquid crystal.

That is, it is an object of the present invention to correct the asymmetry of the changes from a dark state to a bright state and from the bright state to the dark state.

It is another object of the present invention to provide an arrangement for realizing the quick response.

SUMMARY OF THE INVENTION

According to one invention disclosed in the present specification, a liquid crystal electro-optical device comprises, as shown in FIG. 1 concretely, liquid crystal material (liquid crystal layer) 109 interposed and held between a pair of substrates 105 and 114; first means 106 and 113 for forming mainly an electric field in the, direction of the pair of substrates; and second means 107 and 108 and/or 111 and 112 for forming mainly an electric field in the direction parallel to the pair of substrates. States in which orientations of major axes of liquid crystal molecules differ by 90° or approximately 90° are selected by the first and second means.

The states in which the orientations of the major axes of liquid crystal molecules differ by 90° or approximately 90° correspond to that of the liquid crystal layer 109 in FIG. 1 and that of a liquid crystal layer 201 in FIG. 2 for example.

Although two sets of electrodes of a pair of electrodes 107 and 108 which form an electric field having a direction parallel to substrates and a pair of electrodes 111 and 112 which form an electric field having a direction in parallel to substrates are shown as second means in FIG. 1, it is possible to arrange such that only either one of the sets of electrodes is present.

When the two sets of electrodes are to be disposed as described above, it is effective to shift their operating timings so that they will not interfere with each other.

According to a different aspect of these invention whose concrete example is shown in FIG. 1, a liquid crystal electro-optical device comprises liquid crystal material 109 interposed and held between a pair of substrates 105 and 114; first it means 106 and 113 for forming mainly an electric field in the direction of the pair of substrates; and second means 107 and 108 and/or 111 and 112 for forming mainly an electric field in the direction parallel to the pair of substrates. In the liquid crystal electro-optical device, a state (state of the liquid crystal layer 201 in FIG. 2) wherein major axes of liquid crystal molecules orient or approximately orient in the direction of the substrates is obtained by the first means, and the second means contributes in changing to a state in which the major axes of liquid crystal molecules orient or approximately orient in the direction parallel to the face of the substrates (109 in FIG. 1).

It is noted that as it is apparent from FIG. 1, the state in which the major axes of the liquid crystal molecules orient or approximately orient in the direction parallel to the face of the substrates includes a state in which the liquid crystal molecules rotate within a plane parallel to the face of the substrates.

According to a different aspect of these invention whose concrete example is shown in FIG. 1, a liquid crystal electro-optical device comprises means (not shown) for applying orientation restricting force to a liquid crystal layer 109; and means 107 and 108 and/or 111 and 112 for applying an electric field which promotes the orientation restricting force to the liquid crystal layer.

The pair of electrodes 107 and 108 as well as 111 and 112 generate the electric field for promoting the move of the liquid crystal molecules when they are to take the state (state of the liquid crystal layer 109 in FIG. 1) due to the orientation restricting force.

The pair of electrodes 107 and 108 as well as 111 and 112 may be considered that they generate the electric field which provides momentum for the liquid crystal molecules which are to take the state (state in the liquid crystal layer 109 in FIG. 1) due to the orientation restricting force.

According to a different aspect of these invention whose concrete example is shown in FIG. 1, a liquid crystal electro-optical device comprises liquid crystal 109 interposed and held between a pair of substrates 105 and 114; means 107 and 108 and/or 111 and 112 for applying an electric field in the direction parallel to the pair of substrates; and means (given by orientation processing means not shown) for applying orientation restricting force which orients major axes of molecules of the liquid crystal in the direction parallel to the pair of substrates. In the liquid crystal electro-optical device, the liquid crystal is adapted to be selected from a first state in which the major axes of molecules thereof orient in the direction of the pair of substrates (201 in FIG. 2) and a second state in which the major axes orient in the direction parallel to the pair of substrates (109 in FIG. 1), and the second state is obtained by the electric field and the orientation restricting force.

According to a different aspect of these invention whose concrete example is shown in FIG. 1, a liquid crystal electro-optical device has first means 106 and 113 and second means 107 and 108 for applying electric fields to the liquid crystal 109 which can take two states (states indicated by the liquid crystal layers 109 in FIG. 1. and that 201 in FIG. 2). In the liquid crystal electro-optical device, the first means contributes in changing from one state to the other state of the liquid crystal and the second means contributes in changing from the other state to one state of the liquid crystal.

In the invention disclosed in the present specification, it is appropriate to utilize nematic liquid crystal or cholesteric liquid crystal as the liquid crystal material.

Although the transmission type liquid crystal panel will be explained in the present specification, the invention disclosed in the present specification may be applied to a reflective type liquid crystal panel.

The invention disclosed in the present specification may be applied to a liquid crystal display arranged so as to select the state in which liquid crystal molecules are disposed such that major axes thereof orient vertically to the substrates and the state in which the liquid crystal molecules are disposed such that the major axes thereof orient in parallel to the substrates.

The specific nature of the invention, as well as other objects, uses and advantages thereof, will clearly appear from the description and from the accompanying drawings.

BRIEF DESCRIPTION OF DRAWINGS

FIG. 8 is a drawing showing another operating state of the liquid crystal panel of fourth embodiment.

DESCRIPTION OF PREFERRED EMBODIMENTS

[First Embodiment]

Figure 1:
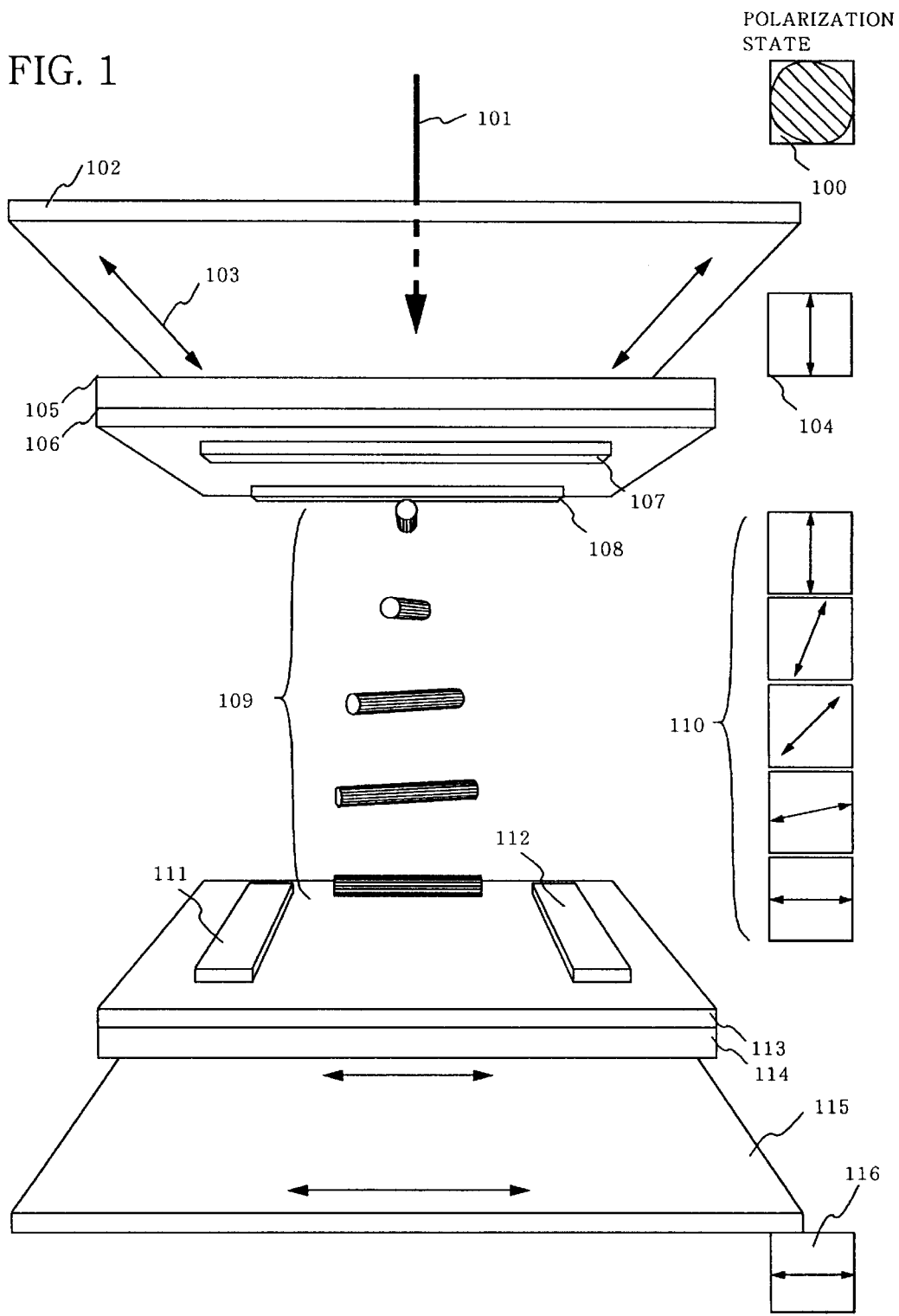
FIG. 1 is a drawing showing an operating state of a liquid crystal panel of first embodiment.

FIG. 1 is a diagrammatic view showing an operation of a liquid crystal panel composed of one pixel constructed by utilizing the invention disclosed in the present specification. This liquid crystal panel may be considered as a liquid crystal shutter for switching whether to transmit or not to transmit incident light. FIG. 1 shows a state in which light enters the liquid crystal panel from the top of the figure. No electric field is applied to a liquid crystal layer 109 in FIG. 1.

At first, a state in which the incident light transmits through the liquid crystal panel will be explained by using FIG. 1. That is, an operation for causing the liquid crystal panel to present a bright state will be explained. It is noted that the present embodiment shows an arrangement of normally white display.

Polarization states of the light seen from the input side (states of the light obtained by seeing the liquid crystal panel from the top of the figure) are shown in boxes on the right side of the figure. In the figure, the incident light 101 containing all polarization states in average before input to the liquid crystal panel is shown as a circularly polarized light for convenience as shown in a box 100.

The incident light 101 enters a polarizing plate 102 at first. The polarizing plate 102 transmits linearly polarized light in the direction 103. Accordingly, the incident light 101 is linearly polarized as shown in a box 104 when seen from the top of the figure right after it has transmitted through the polarizing plate 102.

Next, the incident light 101 transmits through a glass substrate 105 as well as a pixel electrode 106 made from a transparent conductive film such as ITO. Although there arises a subtle change of the polarization state in this stage to be exact, it is neglected here. Although electrodes 106, 107 and 108 are shown in FIG. 1, they do not function specifically in this state.

It is noted that electrodes 106 and 113 function to apply an electric field to the liquid crystal layer 109 in the direction vertical to the substrates. That is, they function to orient major axes of the liquid crystal molecules in the liquid crystal layer 109 in the direction parallel to the incident light 101. Further, electrodes 107 and 108 as well as 111 and 112 function to orient the molecules of the liquid crystal in the direction parallel to the substrates.

Although not shown in the figure, the pixel electrode 106 and the electrodes 107 and 108 are electrically insulated by some insulating means. The same applies also to the case of the pixel electrode 113 and the electrodes 111 and 112.

In the state shown in FIG. 1, the liquid crystal molecules in the liquid crystal layer 109 are in a state as if they are twisted by 90° from the glass substrate 105 to a glass substrate 114 by predetermined orientation restricting force. FIG. 1 shows this state diagrammatically. It is noted that orientation means for applying the orientation restricting force is not shown in the figure.

As the incident light 101 transmits through the liquid crystal layer 109, its polarization direction is changed as shown in boxes 110. This phenomenon is known as rotary power which is caused when a linearly polarized light transmits through a liquid crystal layer which is oriented in spiral. This state is no different from the operating principle of the conventional TN type liquid crystal.

Then, the incident light which has transmitted through the pixel electrode 113 and the glass substrate 114 on the other side (the light which has entered the liquid crystal panel) transmits through a polarizing plate 115.

The orientation of the liquid crystal layer 109 and the disposition of the polarizing plate 115 are set in advance so that the direction of the linearly polarized light given in the stage when the light has transmitted through the liquid crystal layer 109 coincides with the direction of axis of polarization of the polarizing plate 115 at this time. Thereby, the incident light 101 transmits through the liquid crystal panel as the linearly polarized light having the polarization direction shown in a box 116. Thus, the bright state is realized.

Next, a state in which no incident light can transmit through the liquid crystal panel will be explained by using a diagrammatic view shown in FIG. 2.

Figure 2:
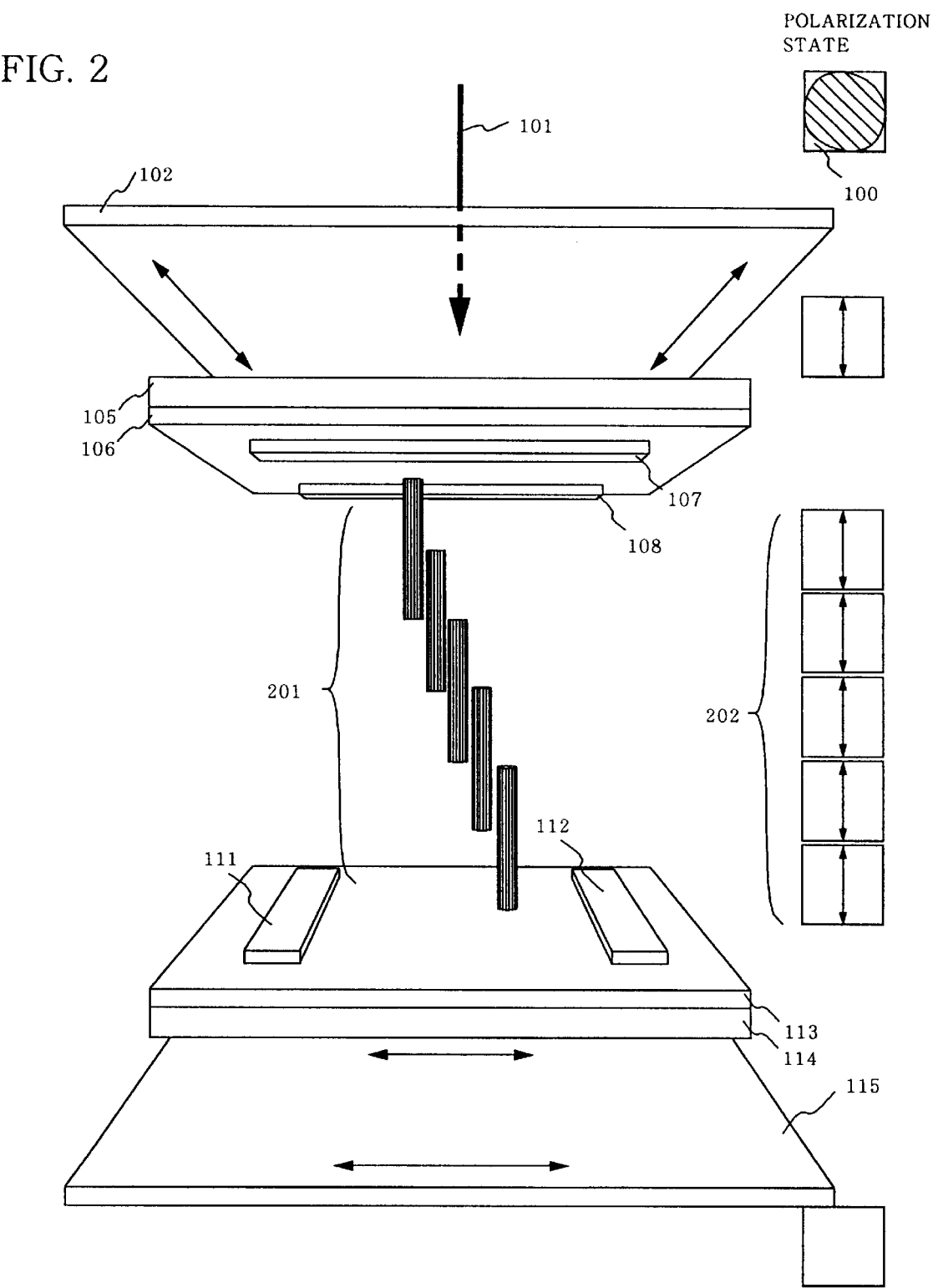
FIG. 2 is a drawing showing another operating state of the liquid crystal panel of first embodiment.

In the state shown in FIG. 2, an electric field is formed between the electrodes 106 and 113. Accordingly, the liquid crystal in the liquid crystal layer 109 is put into a state in which its molecular major axes orient in the direction vertical to the substrates.

It is noted that while the liquid crystal molecules around the substrates do not orient vertically to the substrates and the major axes thereof orient in the direction parallel to the substrates in due to the orientation restricting force, all the liquid crystal molecules are shown as if all of them have changed their orientation in the figure for convenience.

In this state, the polarization state of the incident light does not change in the liquid crystal layer 109 as shown in boxes 202. Accordingly, the incident light 101 cannot transmit through the liquid crystal panel in the state in which the polarizing plates 102 and 115 are disposed so that the axes of polarization thereof cross at right angles from each other. Thus, the dark state is realized.

In the actual operation, whether to transmit or not to transmit the incident light, i.e. whether to display bright state or dark state, is selected by switching the states shown in FIG. 1 and FIG. 2.

Here, the change from the state shown in FIG. 1 to that shown in FIG. 2 is caused by the electric field applied between the pair of electrodes 106 and 113 disposed as plane parallel plates. This operation is the same with that of the conventional TN type liquid crystal display.

Next, an operation for causing the change from the state shown in FIG. 2 to that shown in FIG. 1 will be explained. In this case, the move of the liquid crystal is promoted by the electric field formed in the direction parallel to the substrates between the pair of electrodes 107 and 108 and/or the pair of electrodes 111 and 112

That is, the electric field formed in the direction parallel to the substrates between the pair of electrodes 107 and 108 and/or the pair of electrodes 111 and 112 boosts the movement of the liquid crystal molecules in the liquid crystal layer 109 which try to return from the state shown in FIG. 2 to that shown in FIG. 1.

It may be considered that the electric field formed between the pair of electrodes 107 and 108 and/or the pair of electrodes 111 and 112 causes the liquid crystal molecules which are to orient as shown by the reference numeral 109 in FIG. 1 in the end by the orientation restricting force to start to move forcibly.

That is, the electric field having the direction parallel to the substrates functions to accelerate the move (start-up) of the liquid crystal molecules. Accordingly, this electric field needs to be applied only in the initial stage of the change of the state of the liquid crystal layer 109.

Such arrangement allows a difference between the speed of change (or time necessary for that change) from the state shown in FIG. 1 to that shown in FIG. 2 and the speed of change (or time necessary for that change) from the state shown in FIG. 2 to that shown in FIG. 1 to be corrected. Specifically, it allows the states of transition from transmission to non-transmission and non-transmission to transmission to be brought closer. It then allows the speed of switching whether to transmit or not to transmit the incident light to be increased substantially. It exerts a large effect in suppressing unclear display or flickers in displaying clear images or in switching the transmission/non-transmission at high speed.

[Second Embodiment]

Figure 3:
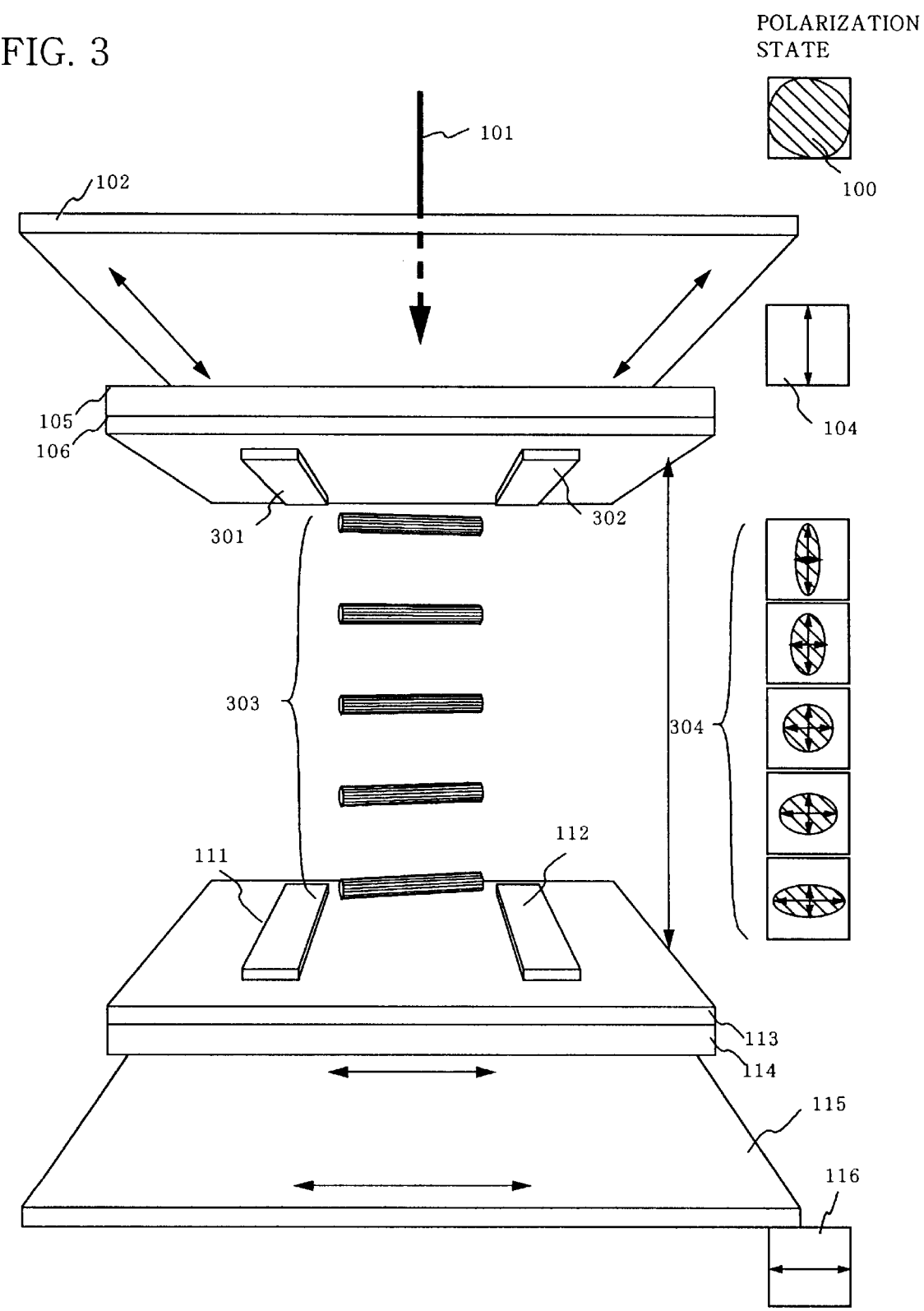
FIG. 3 is a drawing showing an operating state of a liquid crystal panel of second embodiment.

The present embodiment pertains to a display utilizing a double refraction effect. FIG. 3 is a diagrammatic view showing a state in which light transmits through the liquid crystal panel. The state shown in FIG. 3 is the state in which no electric field is applied from the electrodes and the liquid crystal molecules orient in the predetermined direction due to the orientation restricting force. It is noted that the present embodiment presents a case of the liquid crystal panel having the normally white state.

Incident light having a circularly polarized state as shown in the box 100 (state containing all the states is shown as shown in the box 100 for convenience) turns out to be a linearly polarized light as shown in the box 104 as it transmits through the polarizing plate 102.

The incident light having the linearly polarized state as shown in the box 104 enters a liquid crystal layer 303. Here, the liquid crystal layer 303 is set so that an angle made between the direction of the major axis of the liquid crystal molecule and the polarizing direction of the polarized light shown in the box 104 becomes about 45° in order to maxinize the double refraction effect.

In this state, the incident light enters from the direction of minor axis of the liquid crystal molecule. Then, the polarization state of the light which advances through the liquid crystal layer 303 is changed as shown in boxes 304 as it advances by the double refraction effect.

The change of the polarization state shown in the boxes 304 is connected with refractive index anisotropy (Δn) and a thickness d of the liquid crystal layer 303.

In the arrangement shown in FIG. 3, the thickness d of the liquid crystal layer 303 is adjusted so that the maximum polarized component of the transmitted light in the stage when it has transmitted through the liquid crystal layer 303 coincides with the axis of polarization of the polarizing plate 115. That is, the thickness d of the liquid crystal layer is adjusted so that the maximum polarized component of the transmitted light in the stage when it has transmitted through the liquid crystal layer 303 coincides with the polarization direction shown in a box 116.

Such arrangement allows the light which has transmitted through the liquid crystal layer 303 to transmit through the polarizing plate 115 as linearly polarized light whose polarization direction is shown in the box 116. Thus, the bright state is realized.

Figure 4:
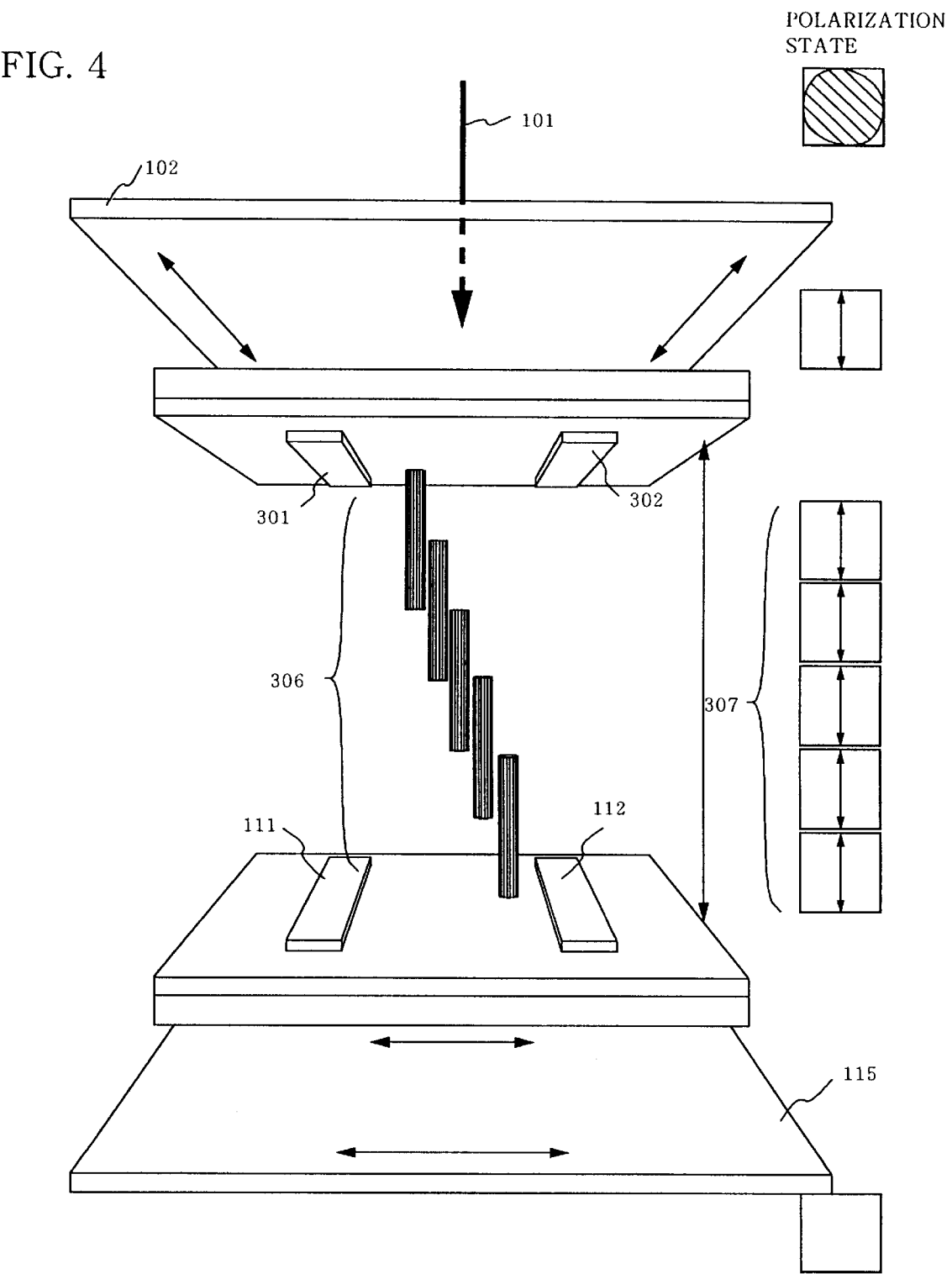
FIG. 4 is a drawing showing another operating state of the liquid crystal panel of second embodiment.

When an electric field is formed by applying voltage between a pair of electrodes 301 and 302 on the other hand, the major axis of the liquid crystal molecules in the liquid crystal layer 303 orient in the direction vertical to the substrates as shown in FIG. 4. It is noted that although the liquid crystal molecules near the substrates are not always the case, they are neglected here.

In the state shown in FIG. 4, the polarization direction of the light passing through a liquid crystal layer 306 does not change as shown in boxes 307. Accordingly, the incident light which has transmitted through the polarizing plate 102 cannot transmit through the polarizing plate 115, thus realizing a non-transmission state.

An operation for switching the two states in FIGS. 3 and 4 will be explained hereinbelow. In this case, the change from the state shown in FIG. 3 to that shown in FIG. 4 is caused by the electric field formed between the electrodes 106 and 113. Then, the change of the states from that shown in FIG. 4 to that shown in FIG. 3 is caused by the help of the electric field formed between the electrodes 301 and 302 as well as the electrodes 111 and 112 in the direction parallel to the substrates and by the orientation restricting force.

In this operation, the both changes of the states from FIG. 3 to FIG. 4 and from FIG. 4 to FIG. 3 are caused by the external electric field applied to the liquid crystal Accordingly, the symmetry of the operation may be enhanced further. It also allows to switch them quickly. It then allows to display in high definition or high speed motion pictures.

The arrangement of switching the state shown in FIG. 3 and that shown in FIG. 4 may be considered as an optical switch for selecting a mode of rotating the polarizing plane of the transmitted light by 90° or a mode of transmitting the transmitted light as it is.

[Third Embodiment]

The present embodiment pertains to an arrangement for displaying in normally black in the device which basically performs the TN type operation as shown in the first embodiment.

Figure 5:
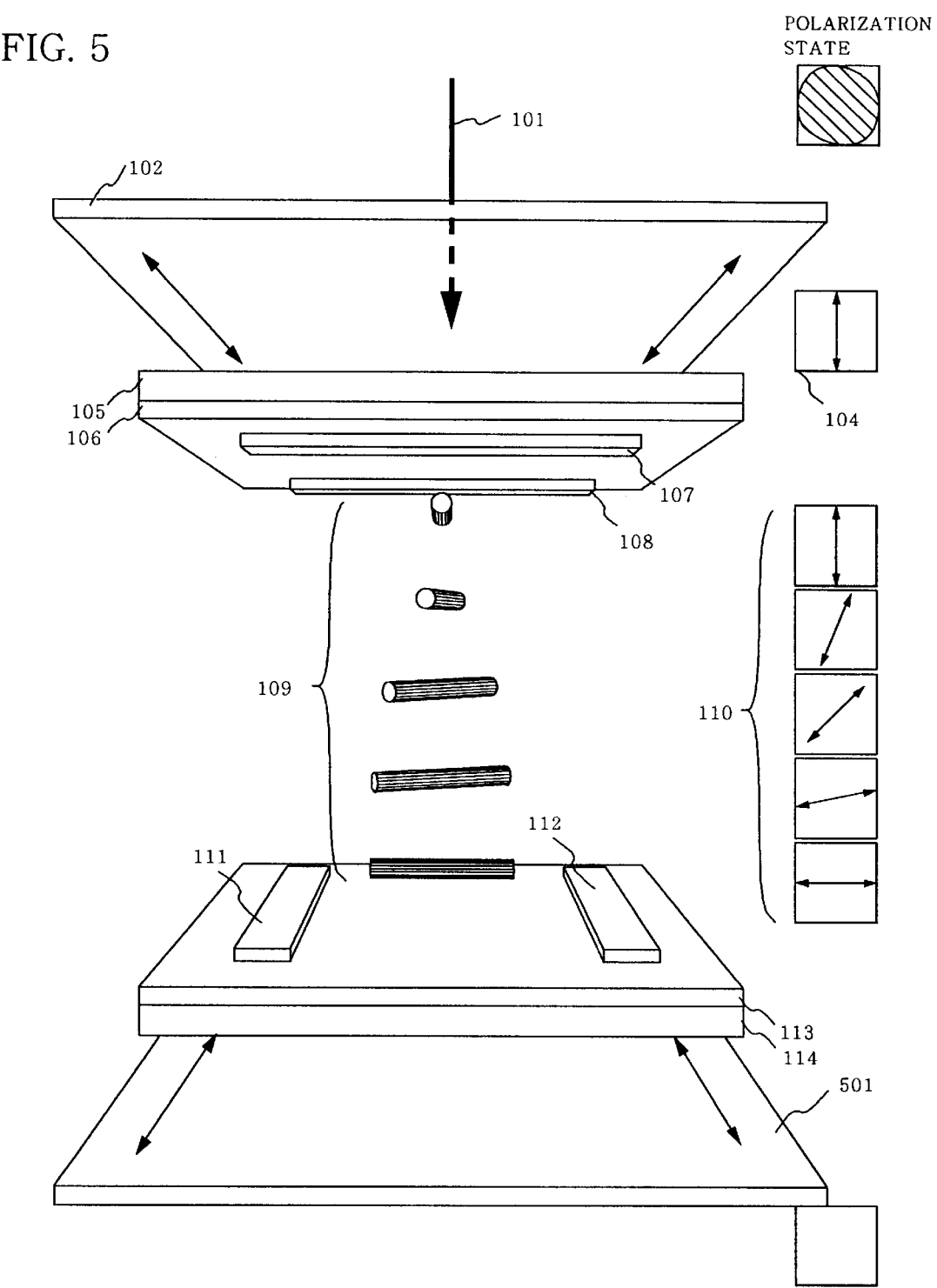
FIG. 5 is a drawing showing an operating state of a liquid crystal panel of third embodiment.

FIG. 5 is a diagrammatic view of the device in the dark state according to the present embodiment. That is, FIG. 5 shows the state in which the incident light cannot transmit through the liquid crystal panel. The same components of the device with those in FIG. 1 are designated by the same reference numerals.

The arrangement of the present embodiment is different from that shown in FIG. 1 in that the directions of the axes of polarization of the pair of polarizing plates 102 and 501 are the same. It is also different in terms of its operation from the first embodiment shown in FIGS. 1 and 2 in that the bright state and the dark state are reversed.

No electric field is applied from each electrode in the state shown in FIG. 5. In this state, the incident light 101 enters the polarizing plate 102 at first and turns out to be the predetermined linearly polarized light as shown in the box 104. It then enters the liquid crystal layer 109. Here, the direction of polarization thereof is changed is shown in boxes 110 in the liquid crystal layer 109 which is twisted by 90° by the rotatory power.

The light which has passed through the liquid crystal layer 109 has a linear polarization direction which differs by 90° from the axis of polarization of the polarizing plate 501. Accordingly, the light which has passed through the liquid crystal layer 109 cannot pass through the polarizing plate 501, thus realizing the dark state.

Figure 6:
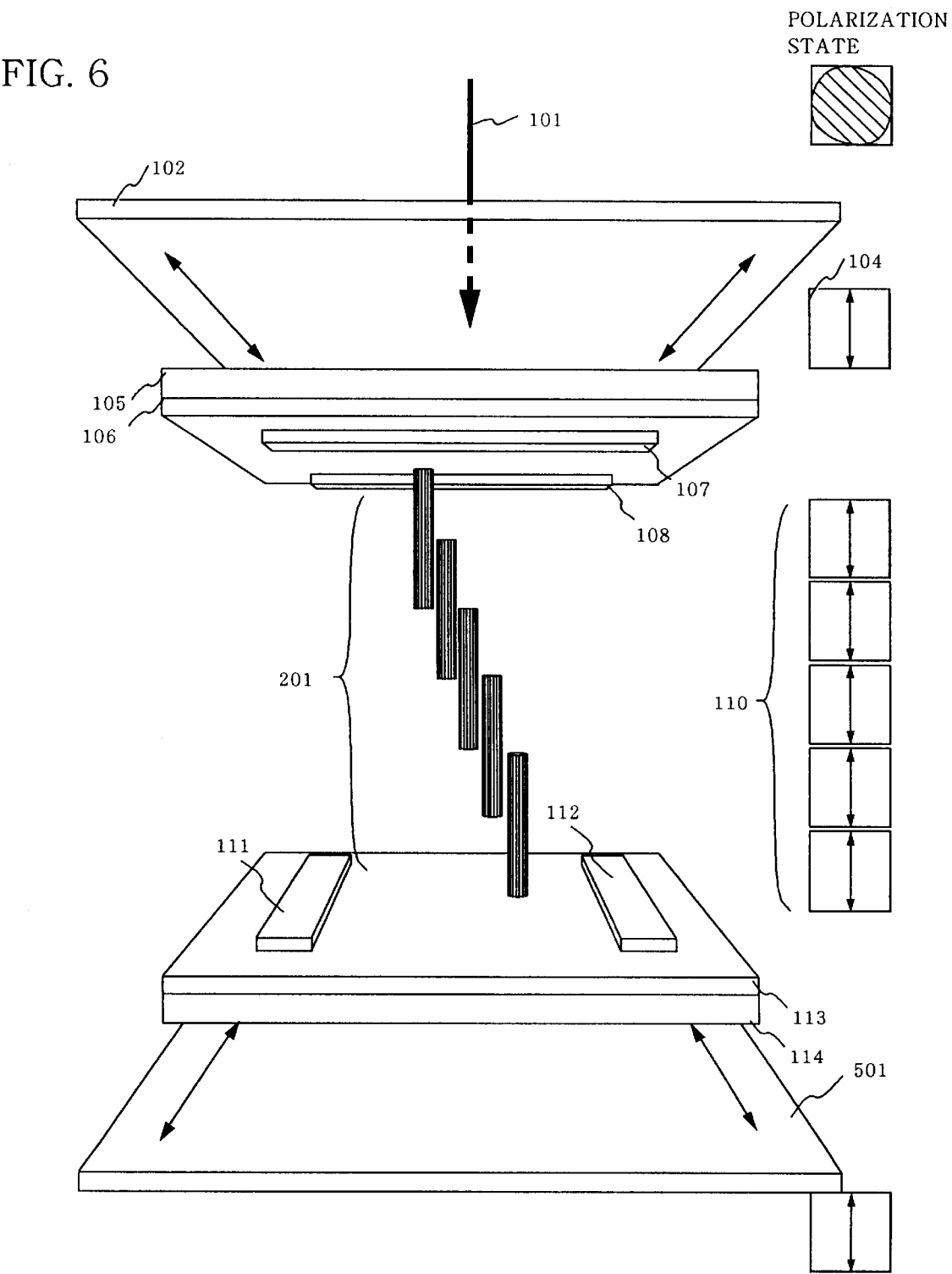
FIG. 6 is a drawing showing another operating state of the liquid crystal panel of third embodiment.

Next, the bright state will be explained. In the bright state, the electric field is applied from the pair of electrodes 106 and 113 as shown in FIG. 6. This electric field causes the major axes of the liquid crystal molecules in the liquid crystal layer 109 to orient in the direction vertical to the substrates. In this state, the light which passes through the liquid crystal layer 109 passes through it without changing its polarization state.

The axis of polarization of the polarizing plate 102 and that of the polarizing plate 501 are set in the same direction in the present embodiment. Accordingly, in this case, the incident light transmits through the liquid crystal panel, thus, realizing the bright state.

The change from the state shown in FIG. 5 (dark state) to the state shown in FIG. 6 (bright state) is caused by the electric field applied from the electrodes 106 and 113 in the direction vertical to the substrates. This operation is the same with that of the conventional TN type liquid crystal.

Then, the change from the state shown in FIG. 6 (bright state) to the state shown in FIG. 5 (dark state) is caused by the electric field formed between the electrodes 107 and 108 and having components mainly in the direction parallel to the substrates, the electric field formed between the electrodes 111 and 112 and having components mainly in the direction parallel to the substrates and the orientation restricting force which acts on the liquid crystal molecules.

The change from the state shown in FIG. 5 to that shown in FIG. 6 and the change from the state shown in FIG. 6 to that shown in FIG. 5 may be caused symmetrically by such operation. Then, the bright state and the dark state may be switched quickly without presenting unnatural display.

[Fourth Embodiment]

The present embodiment pertains to an arrangement in which the bright state and the dark state are reversed in the arrangement of the liquid crystal panel utilizing the double refraction effect shown in the second embodiment. The present embodiment pertains to a liquid crystal panel which operates in normally black.

Figure 7:
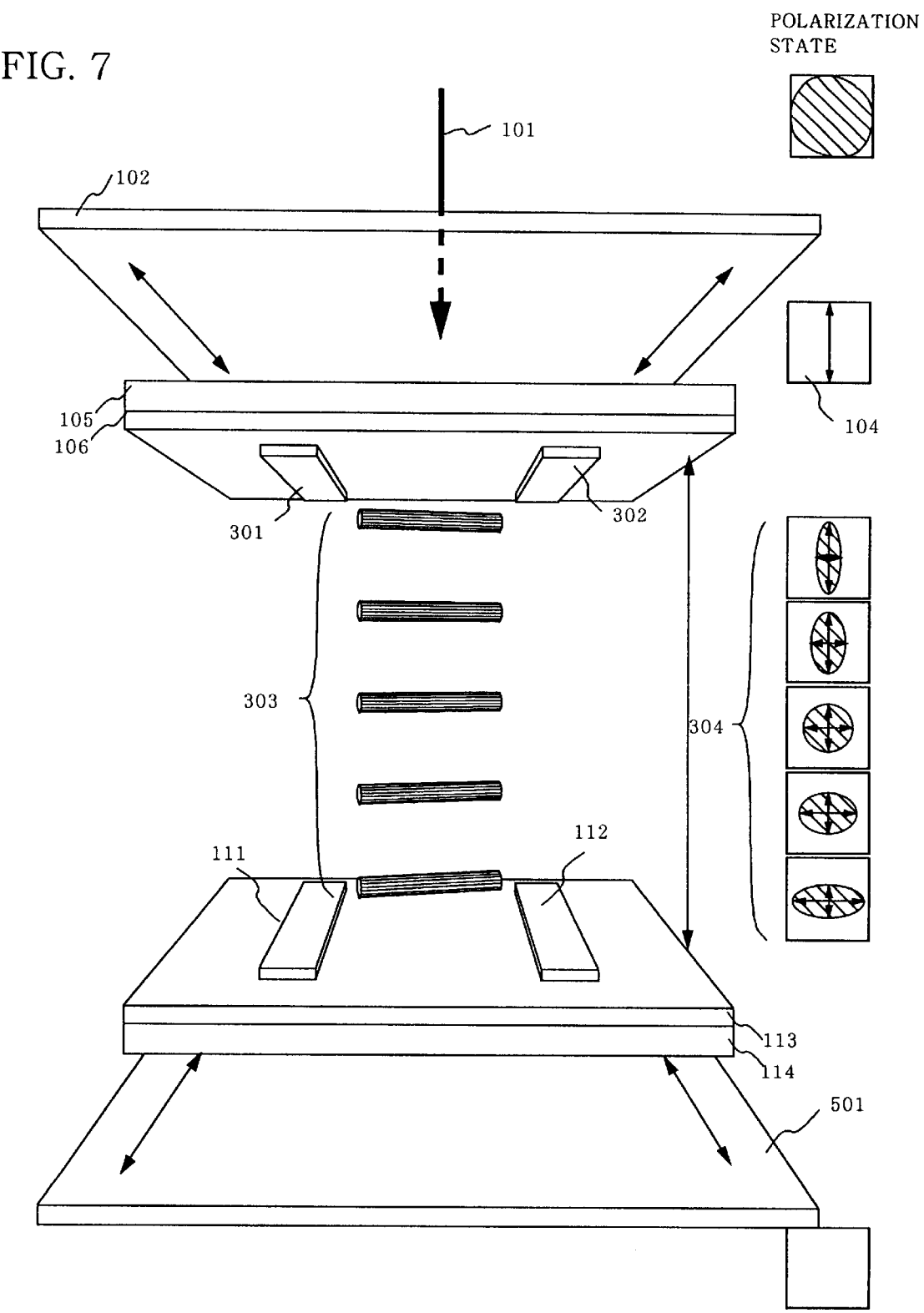
FIG. 7 is a drawing showing an operating state of a liquid crystal panel of fourth embodiment.

FIG. 7 diagrammatically shows the liquid crystal panel in the dark state according to the present embodiment. No electric field is applied from each electrode in the state shown in FIG. 7.

The liquid crystal molecules in the liquid crystal layer 303 orient as shown in the figure by the orientation restricting force caused by orientation means not shown. This is the same with the state shown in FIG. 3.

After passing through the polarizing plate 102, the incident light 101 is put into the linearly polarized state as shown in the box 104. When the light having the linearly polarized state shown in the box 104 enters the liquid crystal layer 303, the polarization state is changed as shown in boxes 304.

Here, the thickness of the liquid crystal layer 303 is set so that the component of the linearly polarized light in the direction different from the polarization direction shown in the box 104 by 90° is maximized. Accordingly, the light which has transmitted through the liquid crystal layer 303 can barely transmit through the polarizing plate 501. Thus, the dark state, i.e. the normally black state, is realized.

Next, the electric field is applied between the electrodes 106 and 113. In this state, the major axes of the liquid crystal molecules in a liquid crystal layer 306 orient in the direction vertical to the substrates as shown in FIG. 8.

Accordingly, the polarization state of the light having the linear polarization as shown in the box 104 does not change in the liquid crystal layer 306 as shown in boxes 307.

The direction of the axes of polarization of the polarizing plates 102 and 501 is the same. Accordingly, the light which has transmitted through the liquid crystal, layer 306 transmits through the polarizing plate 501. Thus, the bright state is realized.

The change from the state shown in FIG. 7 (dark state) to the state shown in FIG. 8 (bright state) is caused by the electric field applied from the electrodes 106 and 113 in the direction vertical to the substrates. This operation is the same with that of the conventional TN type liquid crystal panel.

Then, the change from the state shown in FIG. 8 (bright state) to the state shown in FIG. 7 (dark state) is caused by the electric field formed between the electrodes 301 and 302 and having components thereof mainly in the direction parallel to the substrates, the electric field formed between the electrodes 111 and 112 and having components thereof mainly in the direction parallel to the substrate and the orientation restricting force which acts on the liquid crystal molecules.

The change from the state shown in FIG. 7 to that shown in FIG. 8 and the change from the state shown in FIG. 8 to that shown in FIG. 7 may be caused symmetrically by such operation. Then, the bright state and the dark state may be switched quickly without presenting unnatural display.

[Fifth Embodiment]

The present embodiment pertains to a case of constructing an active matrix type liquid crystal panel by utilizing the invention disclosed in the present specification.

Figure 9A:
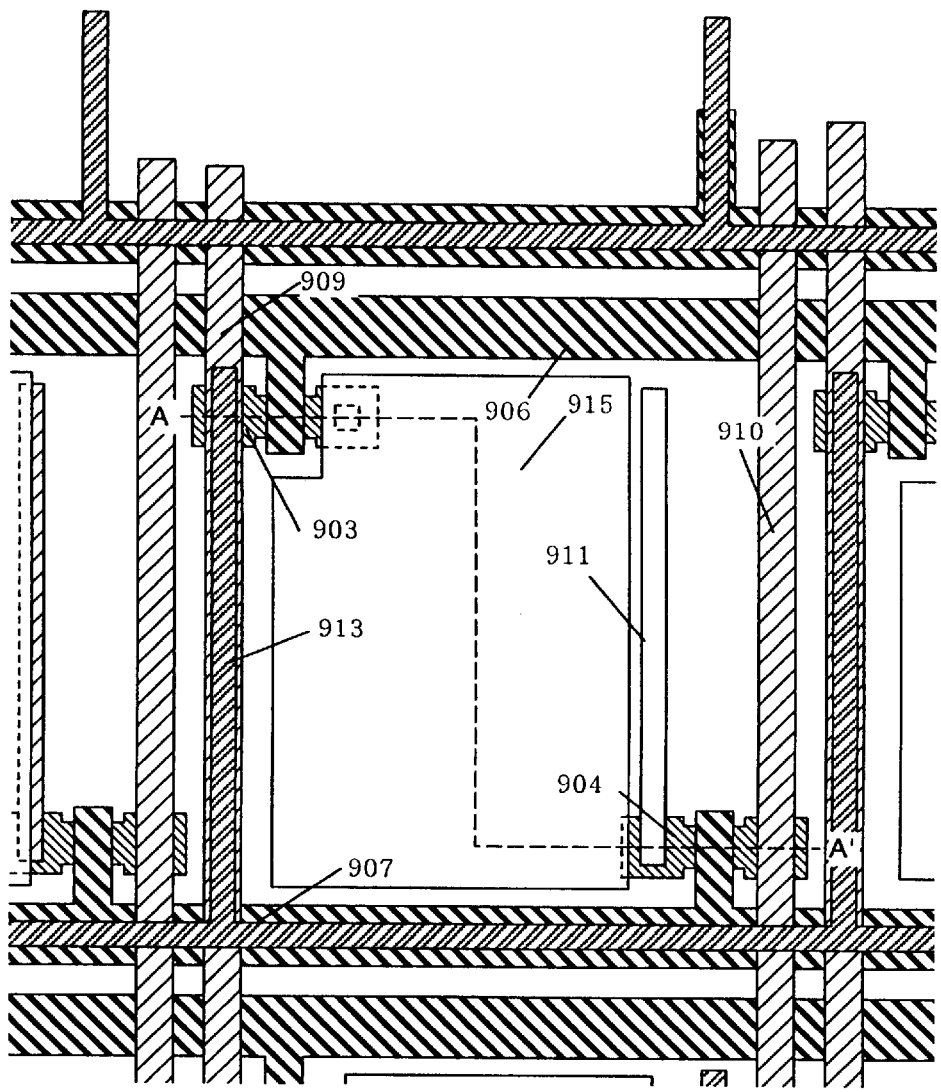
FIGS. 9A and 9B are diagrams showing a part of an active matrix circuit of fifth embodiment and sixth embodiment.
Figure 9B:
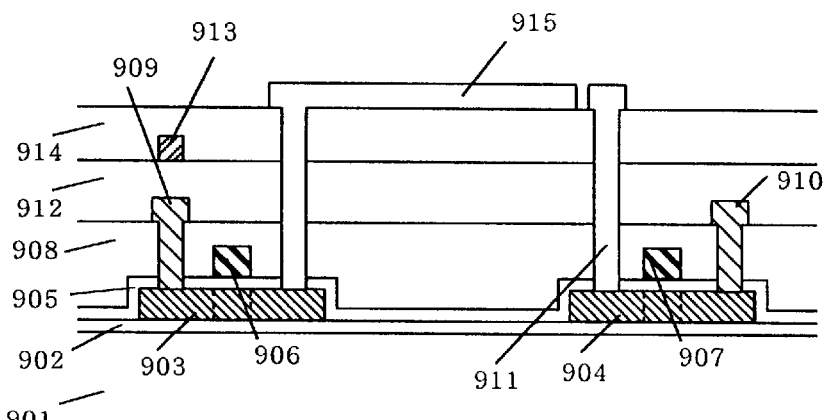

FIGS. 9A and 9B show a section of the liquid crystal panel of the present embodiment. A structure of the substrate on which an active matrix circuit is disposed is shown in FIGS. 9A and 9B. FIG. 9A is a plan view of one pixel region and FIG. 9B is a section view along a line A–A' in FIG. 9A.

In the figures, the active matrix circuit is formed on a glass substrate (or quartz substrates) 901. A silicon oxide film 902 which forms an underlying film has functions of preventing impurities from diffusing to active layers 903 and 904 from the glass substrate 901 as well as relaxing stress which acts between the glass substrate and the active layers.

A source region, a channel forming region and a drain region as well as a LDD (lightly doped drain) region or an offset gate region are formed as necessary on each of the active layers 903 and 904 of the thin film transistor. Preferably, the active layers are made from crystal silicon films. The crystal silicon film may be obtained by crystallizing an amorphous silicon film formed by plasma CVD or low pressure thermal CVD by heating or by irradiating laser light thereto.

A silicon oxide film 905 functions as a gate insulating film. Gate electrodes (gate wires) 906 and 907 are provided by extending gate wires as shown in FIG. 9A. An interlayer insulating film 908 is formed by a silicon oxide film, a silicon nitride film or a multilayer film of the silicon oxide film and the silicon nitride film.

A first source wire 909 functions also as a source electrode. As it is apparent from FIG. 9A, the gate wires 906 and 907 and the first source wire 909 are disposed in a grid.

A signal supplied from the first source wire 909 is selected by the thin film transistor composed of the active layer 903 and is supplied to a transparent electrode (pixel electrode) 915. The transparent electrode 915 has a role of applying the electric field to the liquid crystal in the direction vertical to the substrates.

A signal supplied from a second source wire 910 is selected by the thin film transistor composed of the active layer 904 and is supplied to a second pixel electrode 911. The pixel electrode 911 forms the electric field between a common electrode 913 in the direction parallel to the substrates.

The second pixel electrode 911 is formed in the same time with the pixel electrode 915. These pixel electrodes are made from transparent conductive films such as ITO.

The first source line 909 and the second source line 910 are also formed in the same time. These source lines are made from a low resistant metallic material such as aluminum.

The common electrode 913 is formed on a second interlayer insulating film 912. The common electrode 913 is also made from a low resistant metallic material.

The pixel electrodes 915 and 911 made from the transparent conductive film such as ITO are formed on a third interlayer insulating film 914. Orientation processing means made from a resin material not shown is disposed on the upper surface of the pixel electrodes 915 and 911. Known means may be utilized for this orientation processing means.

[Sixth Embodiment]

The present embodiment pertains to a case of constructing a liquid crystal shutter by utilizing the invention disclosed in the present specification.

The liquid crystal shutter may be considered as a liquid crystal panel composed of one pixel by itself. Accordingly, the arrangement shown in FIG. 9 may be utilized as it is.

It becomes possible to provide a liquid crystal shutter having a faster switching speed by constructing the liquid crystal shutter by utilizing the invention disclosed in the present specification. It becomes useful as an optical shutter when the invention disclosed in the present specification is utilized because the difference of switching states in switching from bright to dark and in switching from dark to bright may be corrected.

As described above, the adoption of the invention disclosed in the present specification allows the asymmetry of the states in changing from the dark state to the bright state and from the bright state to the dark state to be corrected in the liquid crystal panel. It then allows to realize the quick response.

While preferred embodiments have been described, variations thereto will occur to those skilled in the art within the scope of the present inventive concepts which are delineated by the following claims.

What is claimed is:

1. An active matrix liquid crystal device comprising:
a first substrate having a plurality of pixels;
each of the pixels including:
   a first thin film transistor being formed over the first substrate;
   a second thin film transistor being formed over the first substrate;
   wherein each of the first and second thin film transistors controls an electric charge applied to each of the pixels;
   a first electrode being formed over the first substrate and electrically connected to the first thin film transistor;
   a second electrode being formed over the first substrate and electrically connected to the second thin film transistor;
   a common electrode being formed over the first substrate,
   a second substrate being opposed to the first substrate, said second substrate having at least a third electrode;
   a liquid crystal material being interposed between the first and second substrate,
   wherein a first electric field to the liquid crystal material is produced between the common electrode and the first electrode in parallel with a plane of the first substrate;
   wherein a second electric field to the liquid crystal material is produced between the second electrode and the third electrode in a direction perpendicular to the plane of the first substrate.

2. A device according to claim 1, wherein the liquid crystal material is a TN type liquid crystal material.

3. A device according to claim 1, wherein each of the first and second substrates is a glass substrate.

4. A device according to claim 1, wherein each of the first and second electrodes is a transparent conductive film.

5. A device according to claim 1, wherein each of the first and second electrodes comprises ITO.

6. An active matrix liquid crystal device comprising:
a first substrate having a plurality of pixels;
each of the pixels including:
   a first thin film transistor being formed over the first substrate;
   a second thin film transistor being formed over the first substrate;
   wherein each of the first and second thin film transistors controls an electric charge applied to each of the pixels;
   a first electrode being formed over the first substrate and electrically connected to the first thin film transistor;
   a second electrode being formed over the first substrate and electrically connected to the second thin film transistor;
   a common electrode being formed over the first substrate,
a second substrate being opposed to the first substrate, said second substrate having at least a third electrode;
a liquid crystal material being interposed between the first and second substrate;
a pair of polarizing plates being perpendicularly located to each other,
wherein a first electric field to the liquid crystal material is produced between the common electrode and the first electrode in parallel with a plane of the first substrate;
wherein a second electric field to the liquid crystal material is produced between the second electrode and the third electrode in a direction perpendicular to the plane of the first substrate,
wherein the active matrix liquid crystal device displays normally white.

7. A device according to claim 6, wherein the liquid crystal material is a TN type liquid crystal material.

8. A device according to claim 6, wherein each of the first and second substrates is a glass substrate.

9. A device according to claim 6, wherein each of the first and second electrodes is a transparent conductive film.

10. A device according to claim 6, wherein each of the first and second electrodes comprises ITO.

11. An active matrix liquid crystal device comprising:
a first substrate having a plurality of pixels;
each of the pixels including:
   a first thin film transistor being formed over the first substrate;
   a second thin film transistor being formed over the first substrate;
   wherein each of the first and second thin film transistors controls an electric charge applied to each of the pixels;
   a first electrode being formed over the first substrate and electrically connected to the first thin film transistor;
   a second electrode being formed over the first substrate and electrically connected to the second thin film transistor;
   a common electrode being formed over the first substrate,
a second substrate being opposed to the first substrate, said second substrate having at least a third electrode;
a liquid crystal material being interposed between the first and second substrate;
a pair of polarizing plates being located in parallel with each other,
wherein a first electric field to the liquid crystal material is produced between the common electrode and the first electrode in parallel with a plane of the first substrate;
wherein a second electric field to the liquid crystal material is produced between the second electrode and the third electrode in a direction perpendicular to the plane of the first substrate,
wherein the active matrix liquid crystal device displays normally black.

12. A device according to claim 11, wherein the liquid crystal material is a TN type liquid crystal material.

13. A device according to claim 11, wherein each of the first and second substrates is a glass substrate.

14. A device according to claim 11, wherein each of the first and second electrodes is a transparent conductive film.

15. A device according to claim 11, wherein each of the first and second electrodes comprises ITO.

16. An active matrix liquid crystal device comprising:
a first substrate having a plurality of pixels;
each of the pixels including:
   a first thin film transistor being formed over the first substrate;
   a second thin film transistor being formed over the first substrate;
   wherein each of the first and second thin film transistors controls an electric charge applied to each of the pixels;

a first electrode being formed over the first substrate and electrically connected to the first thin film transistor;

a second electrode being formed over the first substrate and electrically connected to the second thin film transistor;

a common electrode being formed over the first substrate, a second substrate being opposed to the first substrate, said second substrate having at least a third electrode;

a liquid crystal material being interposed between the first and second substrate, wherein a first electric field to the liquid crystal material is produced between the common electrode and the first electrode in parallel with a plane of the first substrate, so that a major axis of the liquid crystal material changes an orientation thereof from in a perpendicular direction to in a parallel direction of the first and second substrates, wherein a second electric field to the liquid crystal material is produced between the second electrode and the third electrode in a direction perpendicular to the plane of the first substrate, so that the major axis of the liquid crystal material changes the orientation thereof from in the parallel direction to in the perpendicular direction of the first and second substrates.

17. A device according to claim 16, wherein the liquid crystal material is a TN type liquid crystal material.

18. A device according to claim 16, wherein each of the first and second substrates is a glass substrate.

19. A device according to claim 16, wherein each of the first and second electrodes is a transparent conductive film.

20. A device according to claim 16, wherein each of the first and second electrodes comprises ITO.

* * * * *